（12）United States Patent
Qiu et al.

(10) Patent No.: US 9,156,213 B2
(45) Date of Patent: Oct. 13, 2015

(54) ATMOSPHERIC PLASMA COATING FOR OPHTHALMIC DEVICES

(75) Inventors: Yongxing Qiu, Duluth, GA (US); John Dallas Pruitt, Suwanee, GA (US); Chandana Kolluru, Suwanee, GA (US); Maria A. Dunkle, Lawrenceville, GA (US); Yasuo Matsuzawa, Roswell, GA (US)

(73) Assignee: Novartis AG, Basel (CH)

( * ) Notice: Subject to any disclaimer, the term of this patent is extended or adjusted under 35 U.S.C. 154(b) by 896 days.

(21) Appl. No.: 13/303,186

(22) Filed: Nov. 23, 2011

(65) Prior Publication Data

US 2012/0137635 A1 Jun. 7, 2012

Related U.S. Application Data

(60) Provisional application No. 61/418,533, filed on Dec. 1, 2010.

(51) Int. Cl.
B29D 11/00 (2006.01)

(52) U.S. Cl.
CPC .... B29D 11/00038 (2013.01); B29D 11/00865 (2013.01)

(58) Field of Classification Search
USPC .................. 351/177; 427/574, 536, 553, 577, 427/249.7, 255.7, 904, 109
See application file for complete search history.

(56) References Cited

U.S. PATENT DOCUMENTS

| 2,936,222 | A | 5/1960 | Stevens |
| 3,008,920 | A | 11/1961 | Urchick |
| 3,070,573 | A | 12/1962 | Beck |
| 3,408,429 | A | 10/1968 | Wichterle |
| 3,854,982 | A | 12/1974 | Aelion |
| 4,032,440 | A | 6/1977 | Yasuda |
| 4,137,550 | A | 1/1979 | Kaganowicz |
| 4,311,573 | A | 1/1982 | Mayhan |
| 4,312,575 | A | 1/1982 | Peyman |
| 4,347,198 | A | 8/1982 | Ohkada |
| 4,444,711 | A | 4/1984 | Schad |
| 4,460,534 | A | 7/1984 | Boehm |
| 4,468,229 | A | 8/1984 | Su |
| 4,501,805 | A | 2/1985 | Yasuda |

(Continued)

FOREIGN PATENT DOCUMENTS

| CA | 2139019 A1 | 6/1995 |
| DE | 3415012 A1 | 6/1988 |

(Continued)

OTHER PUBLICATIONS

PCT International Search Report dated Feb. 7, 2012, International Application No. PCT/US2011-061984, International Filing Date Nov. 11, 2011.

(Continued)

*Primary Examiner* — Dah-Wei D Yuan
*Assistant Examiner* — Andrew Bowman
(74) *Attorney, Agent, or Firm* — Jian Zhou

(57) ABSTRACT

The invention provides a method of coating and thereby affecting the surface properties of a substrate such as a contact lens or other ophthalmic device. The method comprises the steps of generating an atmospheric plasma flow from a working gas and controlling the continuity of the atmospheric plasma flow with a power generator, and, introducing the atmospheric plasma flow to a substrate surface.

20 Claims, 4 Drawing Sheets

(56) References Cited

U.S. PATENT DOCUMENTS

| | | |
|---|---|---|
| 4,503,133 A | 3/1985 | van Lier |
| 4,553,975 A | 11/1985 | Su |
| 4,559,059 A | 12/1985 | Su |
| 4,589,964 A | 5/1986 | Mayhan |
| 4,632,844 A | 12/1986 | Yanagihara |
| 4,664,936 A | 5/1987 | Ueno |
| 4,692,347 A | 9/1987 | Yasuda |
| 4,749,457 A | 6/1988 | Yasuda |
| 4,752,426 A | 6/1988 | Cho |
| 4,761,436 A | 8/1988 | Kohno |
| 4,948,485 A | 8/1990 | Wallstén |
| 4,968,532 A | 11/1990 | Janssen |
| 4,980,196 A | 12/1990 | Yasuda |
| 4,994,298 A | 2/1991 | Yasuda |
| 5,158,718 A | 10/1992 | Thakrar |
| 5,176,938 A | 1/1993 | Wallstén |
| 5,182,000 A | 1/1993 | Antonelli |
| 5,267,390 A | 12/1993 | Yang |
| 5,270,082 A | 12/1993 | Lin |
| 5,278,384 A | 1/1994 | Matsuzawa |
| 5,312,529 A | 5/1994 | Antonelli |
| 5,508,317 A | 4/1996 | Müller |
| 5,583,163 A | 12/1996 | Müller |
| 5,690,865 A | 11/1997 | Kindt-Larsen |
| 5,789,334 A | 8/1998 | Nakanishi |
| 5,789,464 A | 8/1998 | Muller |
| 5,805,264 A | 9/1998 | Janssen |
| 5,843,346 A | 12/1998 | Morrill |
| 5,849,810 A | 12/1998 | Muller |
| 5,874,127 A | 2/1999 | Winterton |
| 5,894,002 A | 4/1999 | Boneberger |
| 6,136,386 A * | 10/2000 | Nakahigashi et al. ........ 427/536 |
| 6,213,604 B1 * | 4/2001 | Valint et al. .............. 351/159.33 |
| 6,281,468 B1 | 8/2001 | Souel |
| 6,551,531 B1 | 4/2003 | Ford |
| 6,627,124 B1 | 9/2003 | Herbrechtsmeier |
| 6,800,225 B1 | 10/2004 | Hagmann |
| 6,858,248 B2 | 2/2005 | Qiu |
| 6,881,269 B2 | 4/2005 | Matsuzawa |
| 7,078,074 B2 | 7/2006 | Matsuzawa |
| 7,384,590 B2 | 6/2008 | Kelly |
| 7,387,759 B2 | 6/2008 | Kelly |
| 2004/0116564 A1 | 6/2004 | Devlin |
| 2004/0140578 A1 | 7/2004 | Kelly e |

FOREIGN PATENT DOCUMENTS

| | | |
|---|---|---|
| EP | 0472303 A2 | 7/1991 |
| EP | 0604176 A1 | 12/1993 |
| WO | 0071613 A1 | 11/2000 |
| WO | 2004016405 A1 | 2/2004 |
| WO | 2010071691 A1 | 6/2010 |

OTHER PUBLICATIONS

PCT Written Opinion of the International Searching Authority dated Feb. 7, 2012, International Application No. PCT/US2011-061984, International Filing Date Nov. 11, 2011.

Authors: H. Yasuda Name of Article: Glow Discharge Polymerization Published: Journal of Polymer Science: Macromolecular Reviews, vol. 16, 199-293; 1981.

Authors: N. Dilsiz and G. Akovali Name of Article: Plasma Polymerization of Selected Organic Compounds Published: Polymer vol. 37, No. 2; pp. 333-342; 1996.

* cited by examiner

ATMOSPHERIC PLASMA COATING FOR OPHTHALMIC DEVICES

This application claims the benefit under 35 USC §119 (e) of U.S. provisional application No. 61/418,533 filed Dec. 1, 2010, incorporated herein by reference in its entirety.

The present invention relates generally to the field of ophthalmic devices, and more particularly to surface coating of ophthalmic devices to control the increase or decrease of wettability.

BACKGROUND OF THE INVENTION

The provision of a coating on a substrate may generally be desirable for a variety of reasons including protection of the substrate and provision of desirable surface characteristics which the substrate material does not exhibit to the required degree. In the case of silicone hydrogel contact lenses, it is desirable that the surfaces of silicone hydrogel contact lenses are readily wettable by an aqueous liquid, such as tear fluid, and are capable of retaining an aqueous fluid layer which is beneficial for the comfort of the wearer. However, soft silicone hydrogel contact lenses typically have hydrophobic surfaces or at least some hydrophobic surfaces areas and are required to be subjected to surface treatment to render the surfaces wettable, hydrophilic, and less susceptible to depositions of proteins and/or lipids from the ocular environment. Also, the effect of surface treatment should be durable and the modified surfaces should exhibit thermal, oxidative and hydrolytic stability as well as resistance to formation of deposits from tear components and delamination caused by mechanical stress.

A known approach for modifying the hydrophilicity of a relatively hydrophobic contact lens material is through the use of a plasma treatment under low pressure. The term "plasma" denotes an ionized gas (e.g., created by electric glow discharge which may be composed of electrons, ions of either polarity, gas atoms and molecules in the ground or any higher state of any form of excitation, as well as of photons). This ionized gas is often called "low temperature plasma". For a review of plasma polymerization and its uses reference is made to R. Hartmann "Plasma polymerisation: Grundlagen, Technik and Anwendung, Jahrb. Oberflachentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341. The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY™ and O2OPTIX™ (CIBA VISION), and PUREVISION™ (Bausch & Lomb). Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment under low pressure of silicone hydrogel contact lenses may not be cost effective, because the preformed contact lenses must typically be dried before plasma treatment and because of relative high capital investment associated with plasma treatment equipment.

The present invention is primarily directed to improved coating processes and coatings for ophthalmic devices and other objects without pre-drying them.

SUMMARY OF THE INVENTION

The present invention relates to a method for producing ready-to-use silicone hydrogel contact lenses each having a durable plasma hydrophilic coating. The method comprises the steps of: (a) generating an atmospheric plasma flow from a working gas, wherein the working gas comprises at least one organic compound selected from the group consisting of a $C_1$-$C_{12}$ alkane, an oxaalkane having up to 12 carbon atoms, a $C_2$-$C_{12}$ alkene, an oxaalkene having up to 12 carbon atoms, a $C_2$-$C_{12}$ alkyne, a $C_1$-$C_{12}$ alkanol, a cycloalkanol having up to 12 carbon atoms, an oxaallyne having up to 12 carbon atoms, a mono-cloxaalkane having up to 12 carbon atoms, a bi-clooxaalkane having up to 12 carbon atoms, a tricycloalkane having up to 12 carbon atoms, an aromatic hydrocarbon having up to 12 carbon atoms, and combinations, wherein the at least one organic compound is unsubstituted or substituted by hydroxy, amino, formyl or carboxyl, and containing up to 12 carbon atoms; (b) controlling the continuity of the atmospheric plasma flow with a power generator; (c) introducing the atmospheric plasma flow to a surface of a wet or blot-died wet silicone hydrogel contact lens to form a plasma coating on the wet or blot-dried wet silicone hydrogel contact lens; (d) placing and sealing the silicone hydrogel contact lens with the plasma coating thereon in a lens package containing a buffered saline; and (e) autoclaving the sealed lens package containing the silicone hydrogel contact lens with the plasma coating thereon so as to obtain the ready-to-use silicone hydrogel contact lens, wherein the plasma coating on the ready-to-use silicone hydrogel contact lens survives autoclaving and imparts to the ready-to-use silicone hydrogel contact lens a hydrophilicity/wettability characterized by having a water-break-up time of at least about 5 seconds and/or no more than about 30% of increase in average water contact angle relative to the same plasma coating before autoclaving.

The invention also relates to a system for controlling the surface properties of a substrate, preferably including a plasma generator to produce a flow of atmospheric plasma from a working gas and a power source to control the continuity of the atmospheric plasma flow. The system preferably also includes means for introducing the atmospheric plasma flow to a substrate.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
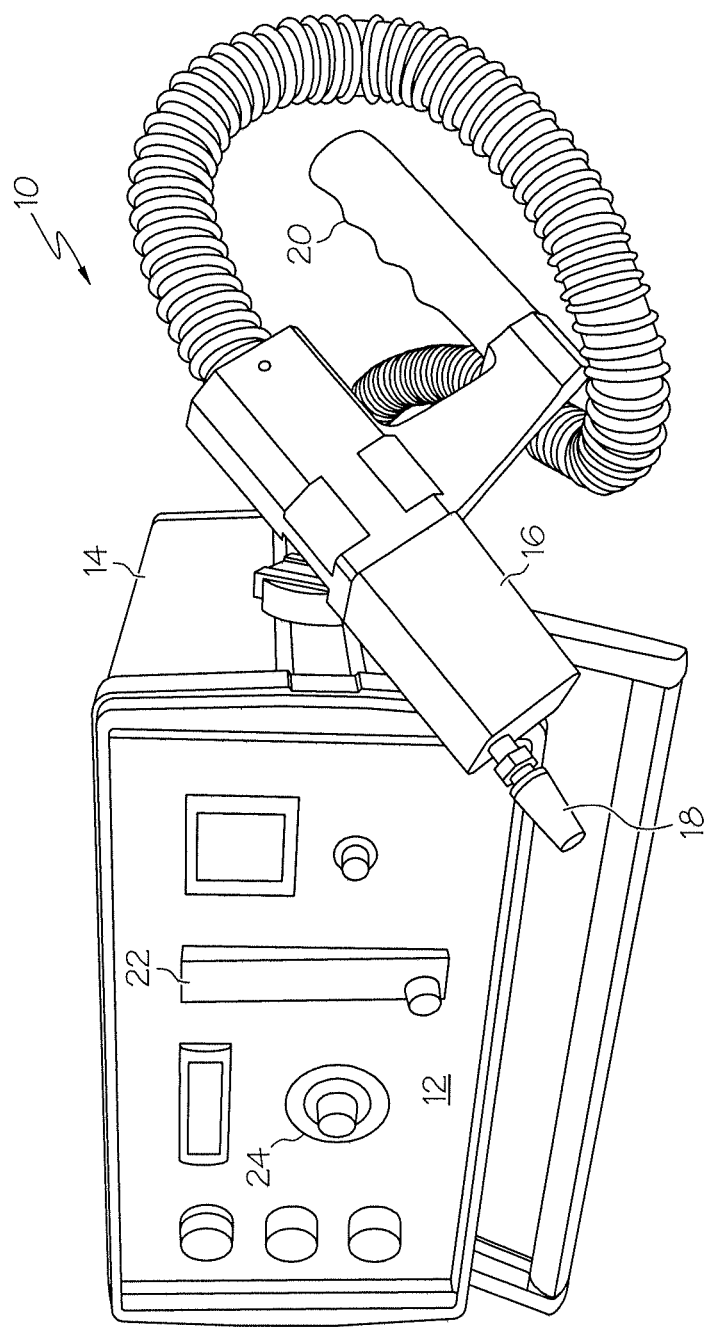
FIG. 1 is a perspective view of a plasma flow system to be used with an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used in this application, the term "ophthalmic lens" refers to an intraocular lens, a contact lens (hard or soft), or a corneal onlay. "Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. As used in this application, the term "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "vinylic monomer" refers to a compound that has one sole ethylenically unsaturated group and can be polymerized actinically or thermally.

As used in this application, the term "olefinically unsaturated group" or "ethylenically unsaturated group" is employed herein in a broad sense and is intended to encompass any groups containing at least one carbon-carbon double bond (C=C). Exemplary ethylenically unsaturated groups include without limitation acryloyl, methacryloyl, allyl, vinyl, styrenyl, or other C=C containing groups.

As used in this application, the term "hydrophilic vinylic monomer" refers to a vinylic monomer which as a homopolymer typically yields a polymer that is water-soluble or can absorb at least 10 percent by weight water.

As used in this application, the term "hydrophobic vinylic monomer" refers to a vinylic monomer which as a homopolymer typically yields a polymer that is insoluble in water and can absorb less than 10 percent by weight water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "water contact angle" refers to an average water contact angle (i.e., contact angles measured by Sessile Drop method), which is obtained by averaging measurements of contact angles.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "fluid" as used herein indicates that a material is capable of flowing like a liquid.

In one example embodiment, the present invention is an atmospheric plasma coating ("APC"), or APC treatment deposition process and coating chemistry, for achieving "wettable" coatings on a substrate.

Atmospheric plasma is typically understood to be plasma sustained at a surrounding atmospheric pressure and can be produced by atmospheric pressure discharges. Example atmospheric pressure discharges include arc discharge, which is a high power thermal discharge of very high temperature (i.e., about 10,000K). Arc discharge can be generated using various power supplies and is commonly used in metallurgical processes. For example, arc discharge is used to melt rocks containing $Al_2O_3$ to produce aluminum. Corona discharge is another atmospheric pressure discharge that is a non-thermal discharge generated by the application of high voltage to sharp electrode tips. Corona discharge is commonly used in ozone generators and particle precipitators. A further atmospheric pressure discharge is a dielectric barrier discharge (DBD), which is a non-thermal discharge generated by the application of high voltages across small gaps wherein a non-conducting coating prevents the transition of the plasma discharge into an arc. DBD is widely used in the web treatment of fabrics because the application of DBD to synthetic fabrics and plastics functionalizes the surface and allows for paints, glues and similar materials to adhere.

The example APC process utilizes a plasma treatment system (e.g., PT-2000 and PT-2000P manufactured by Tri-Star Technologies) including a plasma generator and a plasma nozzle. As shown in FIG. 1, an example plasma treatment system 10 includes a system control panel 12, a plasma generator 14, a plasma electrode 16, a plasma nozzle 18 and a handle 20. The plasma generator 14 includes a power supply, gas flow controller 22 and a power amplifier 24. The plasma generator 14 feeds electrical signals with specific amplitude, frequency and form factor to the primary winding of high voltage transformer. The generator 14 can produce a continuous stream of plasma. Alternatively, appropriately shaped electrical pulses with a defined amplitude and frequency produced by the transformer secondary winding are applied to the plasma electrode 16. An example power supply subassembly includes an AC inlet connector, an AC filter, a predefined ampere fuse and a DC power supply that is used for the gas controller. Preferably, the system control panel 12 allows an operator to change system parameters, such as carrier gas (e.g., inert gas) flow, plasma intensity and exposure time, and monitor system errors. Additionally, the example system control panel 12 includes a timer (not shown) that allows a user to set a precise exposure time.

In use with the example plasma treatment system 10, plasma jets exit the nozzle 18 and reach a substrate to then spread over the substrate surface. The plasma jets preferably exit the nozzle 18 at atmospheric pressure. If the substrate is two-sided, a user can turn the substrate over with tweezers and coat the opposing surface with the plasma jet. The example plasma treatment system 10 can alternatively generate a uniform plasma cloud that completely surrounds, or spreads over, the boundary layer of a substrate surface. The example plasma cloud can occupy a finite volume of space filled with a gas at a defined temperature (e.g., about room temperature).

The plasma typically exists in the surface boundary layer in the vicinity of the nozzle 18 and abruptly decays due to contact with air. A carrier gas (e.g., inert gas: helium, argon or xenon) can, therefore, be introduced to extend or sustain the coverage of the plasma onto the substrate surface. When a charged particle of the plasma collides with an atom of the introduced carrier gas, the charged particle can either ionize to produce another charged particle (i.e., electron and ion) or move apart from the atom. A relative concentration of ions and electrons in the plasma can be on the order of about 1 ppm. Therefore, a very minute percentage of the carrier gas can be involved in the treatment process. Alternatively, a small amount of reagent gases and/or gas mixtures (e.g., air, acetylene, oxygen etc.) can be added into the plasma flow in order to more permanently coat a substrate surface with a coating process.

Figure 2:
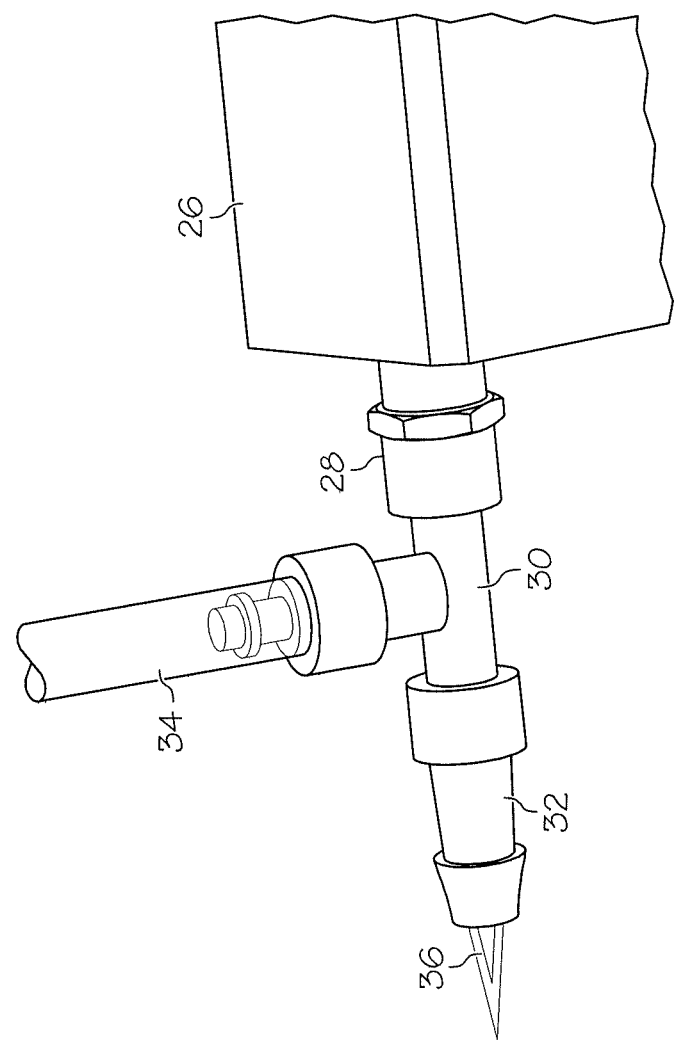
FIG. 2 is a perspective view of a plasma nozzle to be used with an example embodiment of the present invention.
Figure 3:
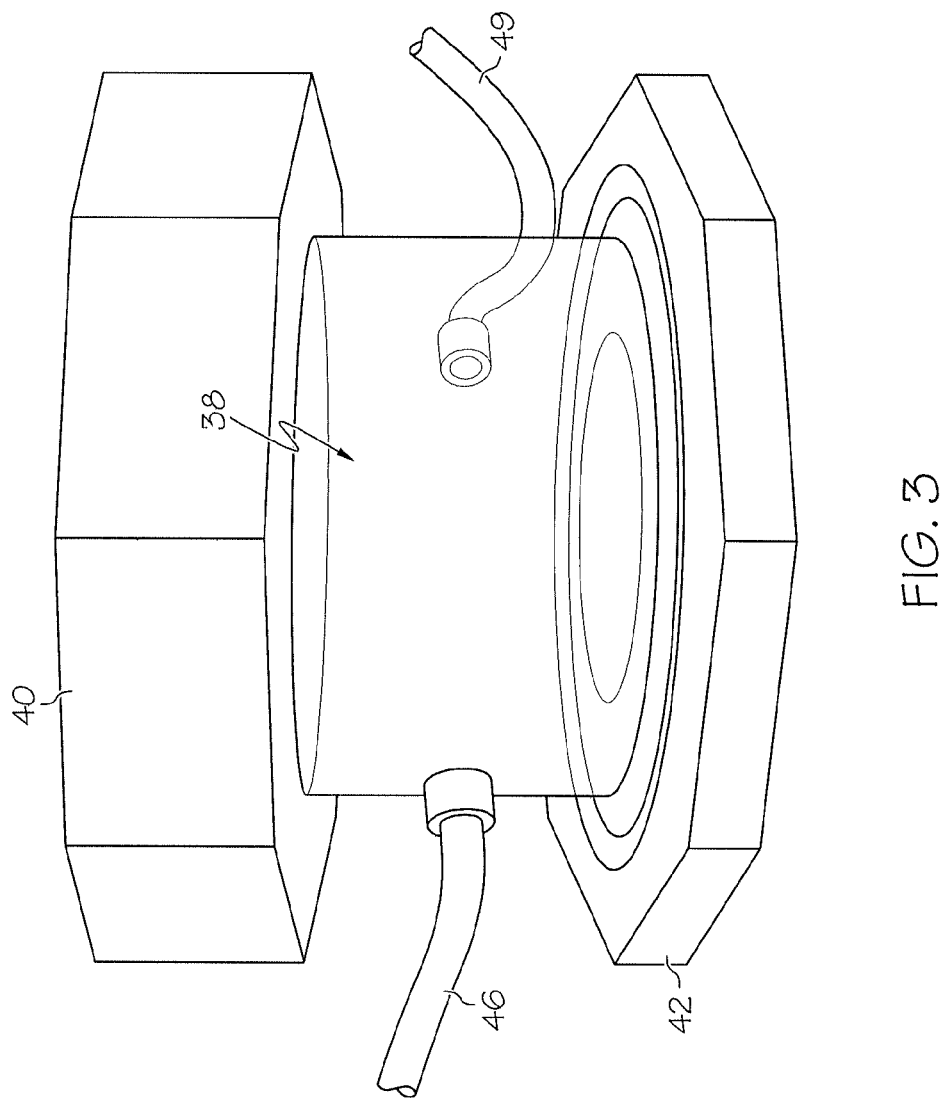
FIG. 3 is a perspective view of a chamber to be used with an example embodiment of the present invention.

FIG. 2 shows an alternate system for introducing such a gaseous mixture into the plasma flow. As shown, an example system includes a plasma electrode 26 connected to a nozzle 32 through an adaptor 28. And, an additional reagent gas mixture line 34 introduces reagent gas to the plasma flow within the nozzle 32 through a connector 30. The reagent gas mixture line 34 preferably provides a reagent gas from a flowmeter separate from the system. In use, the plasma jet 36 exiting the nozzle 32 additionally includes a carrier gas. An example plasma jet 36 exiting the nozzle 32 can include a reagent gas mixture during a coating procedure. When the jet 34 contacts a substrate surface, the gaseous reagent and plasma spreads over a thin boundary layer.

The APC plasma treatment or coating process can alternatively occur within a chamber 38 operable between two insulated metal electrodes 40, 42. The chamber 38 can be defined by a shell or housing. An example chamber 38 can include a gas-in conduit (or valve) 49 and a gas-out conduit (or valve) 46 to regulate flow, pressure and concentration of plasma gas within the chamber. The gas-in conduit 49 can be adapted to connect, and receive plasma from, to the plasma nozzle of the plasma system (FIGS. 1 and 2). Alternatively, the gas-in conduit 49 can be adapted to connect to, and receive plasma from, a separate plasma delivery source (e.g., plasma generator). The gas-out conduit 46 releases plasma from the chamber 38. The chamber 38 housing can have a shape resembling a cylinder with open ends and it can also have other shapes. The open ends can be sealed with the insulated metal electrodes 40, 42. The example chamber 38 housing is constructed of an impermeable material (e.g., glass or plastic). The substrate to-be-coated can be secured within the chamber 38 such that plasma flowing through the chamber spreads across all surfaces of the substrate. The volume of the example chamber 38 can be varied based upon the size of the substrate to be treated or coated, or based on the power of the plasma controller.

The example APC process can be carried out using a consistent plasma cloud that can be generated by a nozzle or filling a chamber by incorporating reagent gas mixture and/or hydrophilic vinylic monomer(s) (e.g., DMA, NVP, HEMA, HEA, and those described below or known to a person skilled in the art). Alternatively, the APC process can be effected by using a pulsed mode of plasma coating and by incorporating hydrophilic vinylic monomer(s) (e.g., DMA, NVP, HEMA, HEA, and those described below or known to a person skilled in the art). In the pulsed plasma mode, the plasma is pulsed according to preset intervals manipulated by the power source. Example pulse intervals used can include a range of between about 0.1 millisecond and 3 milliseconds, and more preferably about 1 millisecond.

An example substrate to be coated according to the system and method of the present invention includes contact lenses, intraocular lenses, and more specifically silicon-hydrogel (SiHy) contact lenses.

In accordance with the invention, any silicone hydrogel contact lenses can be coated according to a method of the invention. A person skilled in the art knows very well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810.

In a conventional cast-molding process where a mold is used only once (i.e., disposable or single use), the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in a Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, CaF2, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In cast-molding, a lens formulation (or a fluid polymerizable composition) typically is dispensed into molds and cured (i.e., polymerized and/or crosslinked) in molds for making contact lenses.

A silicone hydrogel (SiHy) contact lens formulation for cast-molding or spin-cast molding of contact lenses generally comprises at least one components selected from the group consisting of a silicone-containing vinylic monomer, a silicone-containing vinylic macromer, a silicone-containing pre-polymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

In accordance with the invention, a SiHy lens formulation can be a solution or a melt at a temperature from about 20° C. to about 85° C. Preferably, a polymerizable composition is a solution of all desirable components in a suitable solvent, or a mixture of suitable solvents.

A SiHy lens formulation can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Molded silicone hydrogel contact lenses then can be subjected to extraction with an extraction solvent to remove unpolymerized components from the molded lenses and to hydration process, as known by a person skilled in the art. Numerous SiHy lens formulations have been described in numerous patents and patent applications published by the filing date of this application. All of them can be used in a method of the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in a method of the invention.

It is surprised to discover that an atmospheric plasma coating process of the invention can be applied onto wet or blot-dried wet silicone hydrogel contact lenses to form durable hydrophilic coating on the lenses. The term "wet" used in this application in reference to a contact lens (including a silicone hydrogel contact lens) means that the contact lens is in a hydrated state (by water) and still has a water content that is at least about 50%, preferably at least about 65%, more preferably at least about 80%, even more preferably at least about 90% (by weight) of the equilibrium water content (i.e., the value of the water content when the contact lens is fully hydrated). The term "blot-dried" used in this application in reference to a contact lens (including a silicone hydrogel contact lens) means that water on the surface of a contact lens is removed with a lint-free clean cloth or a clean paper tissue or a stream of clean air. The term "durable" used in this application in reference with a coating on a contact lens (including a silicone hydrogel contact lens) means that the hydrophilicity/wettability of the coating on the contact lens is not significantly decreased after the contact lens is autoclaved in a phosphate buffered saline at about 121° C. for one autoclave cycle (i.e., one thirty-minutes cycle), preferably for two autoclave cycle (i.e., two thirty-minutes cycles), as characterized by no significant increase in water contact angle (i.e., more than 30% increase) and/or by having a water break up time (WBUT, determined as described below) of at least about 5 seconds.

It is important for a coating on a contact lens, especially a silicone hydrogel contact lens, to survive at least one autoclave cycle, because ready-to-use contact lenses are required to be sterilized, i.e., autoclaved at about 115-125° C. for at least about twenty minutes. It is believed that silicone components in a silicone hydrogel contact lens tend to migrate to the lens surface when being exposed to air or during autoclave. Any coating on a silicone hydrogel contact lens cannot survive at least one autoclave cycle is not durable but transient.

Without needs for completely or substantially drying silicone hydrogel contact lenses, an atmospheric plasma coating process of the invention can reduce the time, energy and cost required to dry the silicone hydrogel contact lenses.

In order to produce ready-to-use silicone hydrogel contact lenses, silicone hydrogel contact lenses with plasma coating obtained according to an atmospheric plasma coating method of the invention are sterilized by autoclaving the plasma-coated silicone hydrogel contact lenses each immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris(Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino) ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.5 centipoises to about 10 centipoises, more preferably from about 2 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

A packaging solution of the invention can contain a viscosity-enhancing polymer. The viscosity-enhancing polymer preferably is nonionic. Increasing the solution viscosity provides a film on the lens which may facilitate comfortable wearing of the contact lens. The viscosity-enhancing component may also act to cushion the impact on the eye surface during insertion and serves also to alleviate eye irritation.

Preferred viscosity-enhancing polymers include, but are not limited to, water soluble cellulose ethers (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), water-soluble polyvinylalcohols (PVAs), high molecular weight poly(ethylene oxide) having a molecular weight greater than about 2000 (up to 10,000,000 Daltons), polyvinylpyrrolidone with a molecular weight of from about 30,000 daltons to about 1,000,000 daltons, a copolymer of N-vinylpyrrolidone and at least one dialkylaminoalkyl(meth) acrylate having 7-20 carbon atoms, and combinations thereof. Water soluble cellulose ethers and copolymers of vinylpyrrolidone and dimethylaminoethylmethacrylate are most preferred viscosity-enhancing polymers. Copolymers of N-vinylpyrrolidone and dimethylaminoethylmethacrylate are commercially available, e.g., Copolymer 845 and Copolymer 937 from ISP.

The viscosity-enhancing polymer is present in the packaging solution in an amount of from about 0.01% to about 5% by weight, preferably from about 0.05% to about 3% by weight, even more preferably from about 0.1% to about 1% by weight, based on the total amount of the packaging solution.

A packaging solution can further comprises a polyethylene glycol having a molecular weight of about 1200 or less, more preferably 600 or less, most preferably from about 100 to about 500 daltons.

Where the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like). In accordance with the invention, the packaging solution can further comprises mucin-like materials, ophthalmically beneficial materials, and/or surfactants.

Exemplary mucin-like materials include without limitation polyglycolic acid, polylactides, and the likes. A mucin-like material can be used as guest materials which can be released continuously and slowly over extended period of time to the ocular surface of the eye for treating dry eye syndrome. The mucin-like material preferably is present in effective amounts. Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj® 52), polyoxyethylene propylene glycol stearate (Atlas® G 2612), and amphoteric surfactants under the trade names Mirataine® and Miranol®.

The APC coating chemistry in this embodiment imparts a wettable and stable coating to the silicone hydrogel contact lenses. For example, the coating based on acetylene/air mixture (e.g., using argon as a carrier gas to generate plasma) is wettable and stable against the effects of an autoclave. By incorporating appropriate one or more hydrophilic vinylic monomers (e.g., DMA, NVP, HEMA, HEA, and those described below or known to a person skilled in the art) into the APC of acetylene/air, the surface properties of the coating are improved, for example, by further improving the substrate surface hydrophilicity and lubricity, etc.

Any suitable hydrophilic vinylic monomers can be used in this aspect of the invention. Suitable hydrophilic vinylic monomers are, without this being an exhaustive list, hydroxyl-substituted $C_1$-$C_6$ alkyl methacrylates or acrylates, hydroxyl-substituted $C_1$-$C_6$ alkyl vinyl ethers, $C_1$ to $C_6$ alkyl methacrylamides or acrylamides, di-($C_1$-$C_6$ alkyl)methacrylamides or acrylamides, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino-substituted $C_1$-$C_6$ alkyl- (where the term "amino" also includes quaternary ammonium), mono($C_1$-$C_6$ alkyl amino)($C_1$-$C_6$ alkyl) and di($C_1$-$C_6$ alkyl amino)($C_1$-$C_6$ alkyl)(meth)acrylates, allyl alcohol, N-vinyl $C_1$-$C_6$ alkylamide, N-vinyl-N—$C_1$-$C_6$ alkyl amide, and combinations thereof.

Examples of preferred hydrophilic vinylic monomers are acrylamide, methacrylamide, N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol(meth)acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

An advantage of this invention relates to the ability to deposit hydrophilic films on polymer substrates so as to achieve enhanced wettability and/or change surface property. A hydrophilic film produced by a plasma polymerisation is thereby obtained (i.e., a hydrophilic film of a plasma-deposited material is deposited on a polymer substrate, especially a silicone hydrogel contact lens). The hydrophilic film produced by plasma polymerisation typically can have a thickness in the range from 1 to 800 nm, preferably of 5 to 500 nm and, more preferably, of 10 to 250 nm. Such a thickness of a hydrophilic film produced by plasma polymerisation can be controlled by the residence time of the substrate in the presence of plasma nozzle jet or by the throughput in the reactor chamber. The thickness of the hydrophilic film can also be increased or decreased by altering the power, time and flow of the plasma jet.

A working gas is understood as meaning the composition of a gas or mixture of gases before it is converted into a plasma state. For APC treatment, an example working gas can include an inert gas. For APC coating, an example working gas can include both an inert carrier gas and a reagent gas. A working gas is typically produced by volatilizing an organic compound which has been placed in a storage vessel at room temperature and under normal pressure. If the compound is a gas, the gas can be mixed to produce the working gas. If the compound is a liquid, the liquid is volatilized to produce the working gas. A compound can be volatilized by applying a vacuum to, and thermostatically controlling, the storage vessel containing the compound. The storage vessel is typically connected to the plasma reactor by a controllable inlet valve.

Exemplary organic compounds and/or gases usable with the system and method of the present invention include aliphatic, alicyclic, araliphatic hydrocarbons or oxahydrocarbons or aromatic compounds, each unsubstituted or substituted by hydroxy, amino, formyl or carboxyl, and containing up to 12 carbon atoms inclusive. Preferred suitable organic compounds and/or gases include alkanes, oxaalkanes, alkenes, oxaalkenes, alkynes, oxaallynes, mono-, bi- or tricycloalkanes, mono-, bi- or tricyclooxaalkanes or aromatic hydrocarbons, each unsubstituted or substituted by hydroxy, amino, formyl or carboxyl, and containing up to 12 carbon atoms inclusive. Further preferred suitable organic compounds and/or gases include lower alkanes, lower oxaalkanes, lower alkenes, lower oxaalkenes, lower alkynes, lower oxaalkynes or cycloalkanes, each unsubstituted or substituted by hydroxy, amino, formyl or carboxyl, and containing 3 to 8 carbon atoms, or oxacycloalkanes which are unsubstituted or substituted by hydroxy, amino, formyl or carboxyl and contain 2 to 8 carbon atoms, or unsubstituted benzene or benzene which is substituted by hydroxy, amino, formyl, carboxyl or $C_i$-$C_a$alkyl. Very particularly preferred organic compounds and/or gases include alkanes, alkynes, alkanols or cycloalkanols, each containing up to 8 carbon atoms inclusive. The term "lower" qualifying, inter alia, lower alkane, lower alkyne, lower oxaalkane and the like, denotes that the compounds or radicals so defined contain up to 8 carbon atoms inclusive.

In a further embodiment of the present invention, the substrate to be coated can be a contact lens suitable for extended wear, i.e. for continuous wear of more than six days and six nights up to a time of about 30 days. This type of soft contact lenses includes those comprising polysiloxane and/or perfluoroalkyl-polyether groups which exhibit the desired high oxygen- as well as high ion- and water-permeability. If this type of substrate is coated in accordance with the present invention with a hydrophilic monomer, coated contact lenses are obtained which exhibit the following desirable properties as compared to conventionally surface coated contact lenses: increased permeability for oxygen, carbon dioxide, water and ions; excellent wettability, lubricity and stability in the ocular liquid surroundings; improved comfort for the wearer as well as resistance against irreversible deposition of substances occurring in the ocular surroundings, including proteins, lipids, mucins and salts; decreased adhesiveness for microorganisms; decreased tendency of microcrack formation within the coating during sterilization in the autoclave in phosphate buffered saline; and superior on-eye performance including very low cornea swelling, eye irritation and very good mobility on the eye during continuous wear of the lens over an extended time of up to 30 days.

A silicone hydrogel contact lens with a coating obtained according to a method of the invention has a wettable surface characterized by having an averaged water contact angle of preferably about 80 degrees or less, more preferably about 65 degrees or less, most preferably about 55 degrees or less.

A method of the invention for lens surface treatment does not affect significantly the mechanical and physical properties of a silicone hydrogel contact lens under surface treatment. A silicone hydrogel contact lens with a coating obtained according to a method of the invention has at least one property selected from the group consisting of an oxygen permeability of preferably at least about 40 barrers, more preferably at least about 55 barrers, even more preferably at least about 70 barrers, an elastic modulus of from about 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa, an Ionoflux Diffusion Coefficient, D, of, preferably at least about $1.0 \times 10^{-5}$ mm$^2$/min, more preferably at least about $2.0 \times 10^{-5}$ mm$^2$/min, even more preferably at least about $6.0 \times 10^{-5}$ mm$^2$/min, an equilibrium water content of preferably from about 15% to about 55%, more preferably from about 20% to about 38% by weight when fully hydrated, and combinations thereof.

In still further alternate embodiments, the substrate can include contact lens packaging shell manufactured of a polypropylene or other plastic material, whereby the packaging surface is coated to increase the hydrophilicity of the surface and reduce stickiness of a lens that is contained within the package.

The wettability of the lenses (before or after autoclave) can also be assessed by determining the time required for the water film to start breaking on the lens surface. Briefly, lenses are removed from the vial or foil package and washed with distilled (DI) water (e.g. greater than about 100 ml) in order to remove loosely bound packaging additives from the lens surface. The lens is then placed back in phosphate buffered saline (PBS) for about 5 min and then removed from the PBS and held against a bright light source. The time that is needed for the water film to break (de-wet) exposing the underlying lens material is noted visually. Uncoated lenses typically instantly break upon removal from DI water and are assigned a WBUT (i.e., "water break up time" as is typically understood by those having ordinary skill in the art) of 0 seconds. Lenses exhibiting WBUT greater than or equal to about 5 seconds are considered wettable and are expected to exhibit adequate wettability on-eye.

Example 1

Etching of Lenses by Argon, or Argon/Air, Argon/O2 Atmospheric Plasma

Figure 4:
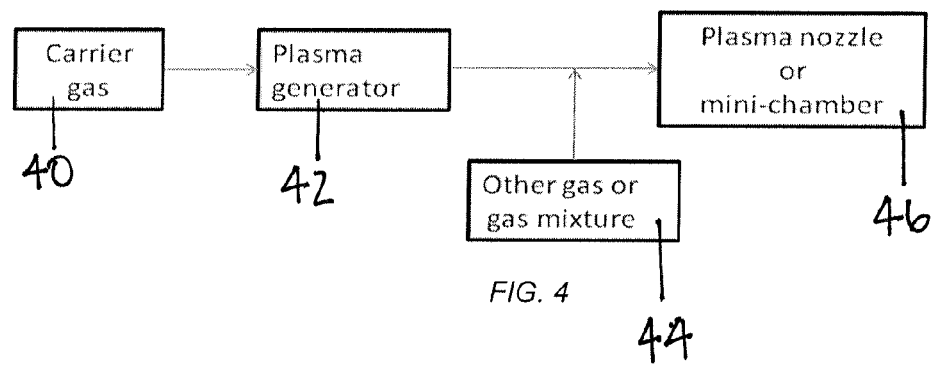
FIG. 4 is a schematic diagram of a method for controlling the surface properties of a substrate.

An experimental set-up is shown in FIG. 4. A carrier gas 40 is fed thru a plasma generator 42 (e.g., Plasma Treatment System, PT-2000P or PT-2000, from Tri-Star Technologies)

that controls the plasma power as well as the flow rate of the carrier gas. Additional gas or gas mixture 44 (e.g. air, or oxygen in this example or acetylene in other examples) is fed thru the plasma nozzle or mini-chamber 46. Wet uncoated lotrafilcon B lenses (after blot dry using lint-free clean cloth (Alpha Wipe TX1009) to remove water on lens surface) or dry lotrafilcon B lenses are placed in a chamber, otherwise herein referred to as a "mini-chamber", and treated with atmospheric plasma using different gases or gas mixtures. The lenses become wettable after treatment, but become no longer wettable after autoclave in phosphate buffered saline.

| Lot # | Conditions | Individual contact angle |
|---|---|---|
| A | Ar, 10 LPM* (liter per minute), 2 min, dry lens | 28, 28, 26, 26 |
| B | Ar, 10 LPM, air, 40 sccm**, 2 min, dry lens | 29, 29, 47, 47, 50, 40 |
| C | Ar, 10 LPM, O2, 40 sccm, 2 min, dry lens | 30, 30, 40, 40 |
| D | Ar, 7 LPM, O2, 20 sccm, 2 min, dry lens | 67, 67, 70, 70 |
| E | Ar, 7 LPM, 2 min, dry lens | 25, 25, 38, 38 |
| F*** | Ar, 7 LPM, 2 min, dry lens | 30, 30, 35, 36 |
| G*** | Ar, 7 LPM, 2 min, wet lens | 32, 35, 34, 38 |

*LPM: liter per minute
**sccm: standard cubic centimeter
***after autoclaved in PBS, the lenses are no longer wettable.

Example 2

Coating on Silicon Wafers

A few coating runs are performed on Si wafer using acetylene ($C_2H_2$) and air mixture. The silicon wafer is placed inside the mini-chamber. As listed in following table, the mixture composition would impact coating thickness.

TABLE 1

| Coating thickness as measured by ellipsometry. | | |
|---|---|---|
| Air (sccm) | Thickness on Si wafer (Å) | Contact angel on Si (degree) |
| 5 | 839, 783 | 55, 55 |
| 10 | 946, 869 | 56, 56 |
| 20 | 773, 792 | 46, 46 |
| 30 | 664, 641 | 50, 50 |
| 50 | 308, 380, 406 | 42, 42 |
| 50 | 411, 390, 374 | n/a |

The coating parameters are as following: 0.1 LPM of $C_2H_2$, 2 min coating, with helium as the carrier gas. Allow gas flow through the mini chamber for about 5 min before coating.

Example 3

Wettable and Stable Coating with Acetylene ($C_2H_2$)/Air Atmospheric Plasma Uncoated lotrafilcon B lenses from CIBA VISION are coated with the use of PT2000 plasma generator and a mini plasma chamber. An exemplary of parameters used is as following: argon flow rate at 6LPM, 0.1LPM $C_2H_2$, 40 sccm of air, and 20.8 KHz frequency for the plasma generator.

A total of about 3 minutes of plasma treatment (about 1.5 minutes for each side) is performed using dry lenses (7-15-E). Each lens is "sandwiched" between two metal wire holders. The lenses are flipped after the first 1.5 min plasma treatment. Another experiment is performed using same coating parameters except a total of one time of 3 min plasma treatment (instead of 1.5 min for each side) (7-15-F). Each lens is "sandwiched" between two metal wire holders.

7-16-1, same coating condition as 7-15-E, but using hydrated and blot dried wet lenses.

7-16-2, same condition as 7-15-F, but using hydrated and blot-dried wet lenses

Lenses are wettable after once or twice autoclave in PBS, with an average water breakup time of more than 5 seconds after one or twice autoclave.

The surface compositions of the lenses are analyzed by x-ray photoelectron spectroscopy (XPS). As compared to uncoated lenses, the C % increases. Uncoated lenses have a c % of 50% or less, The Si % decreases after coating. The uncoated lenses have a Si % of 12% or more.

| Sample | C % | N % | O % | F % | Si % |
|---|---|---|---|---|---|
| 7-15-E, once autoclaved | 55.1 | 3.6 | 26.8 | 7.4 | 7 |
| 7-15-F, once autoclaved | 62.3 | 4.2 | 25.3 | 3.6 | 4.5 |
| 7-15-E, twice autoclaved | 52.8 | 3.7 | 26.9 | 8.3 | 8.3 |
| 7-15-F, twice autoclaved | 53.8 | 3.9 | 25.6 | 7.6 | 9 |
| 7-16-1, once autoclaved | 57.3 | 3 | 26.2 | 6.3 | 7.3 |
| 7-16-2, once autoclaved | 53.8 | 3.5 | 25.3 | 8.3 | 9.1 |

Example 4

$C_2H_2$/DMA Coating

Experiments are done to use pulse mode plasma (100 minsec on and 100 minisec off) to increase the lubricity of coating by incorporate lubricious component (e.g. dimethylacrylamide, DMA). Uncoated lotrafilcon B lenses (from CIBA VISION) are used in this example. The lenses coated with $C_2H_2$/DMA atmospheric plasma appear to be more lubricious to finger touch.

Example 5

Sub Vacuum Coating

Alternatively still, a sub-vacuum coating process can be used to effect the hydrophilic coating on a substrate. The use of such a sub-vacuum coating does not require the use of a carrier gas and/or allows a user to reduce the flow rate. A sub-vacuum of 2~5 torr can be established within the mini chamber when pulled vacuum from a pump for less than about 30 sec. Plasma can be generated without using carrier gas.

Example 6

Coating on Molds

A Tetraethoxysilane (TEOS) bubbler is purchased from Gelest and connected to the atmospheric plasma system. Reusable glass molds similar to the molds shown in FIGS. 1-6 in U.S. Pat. Nos. 7,384,590 and 7,387,759 (FIGS. 1-6) are coated. The coated glass molds have a contact angle of about 65 degrees, as compared to less than about 10 degrees for uncoated glass molds. The coating on the glass molds is tested for its ability to help to minimize the mode separation force, when using a silicone hydrogel lens formulation that does not contain mold release agent.

When using the coated molds to make lenses from silicone hydrogel lens formulations described in Examples 4 and 6 of WO2010071691 (herein incorporated by reference in its entirety), without mold release agent, the mold separation force is very low (in the low 20 s as compared to more than 100 for uncoated molds). No star tears are observed for lenses with low mold separation force. The following table is a representation of mold separation forces for 18 lenses made from using two coated glass molds.

| Group 1 | 20 | 21 | 119 | 213 | 25 | 21 | 23 | 22 | 20 |
|---------|----|----|-----|-----|----|----|----|----|----|
| Group 2 | 23 | 26 | 23  | 20  | 21 | 21 | 22 | 21 | 20 |

Example 7

Package Shell Treatment by Atmospheric Plasma

Polypropylene (PP) package shells are treated with atmospheric argon plasma and the surface wettability of the treated shells is evaluated by using Acudyne test. The plasma set-up includes a Tri-Star plasma generator (PT-2000P) and a ¼ inch plastic nozzle. Distance between shell and plasma nozzle is adjusted to 1 mm or 3 mm. Plasma intensity tested ranges from 60% to 90% or to 99%. Ar flow rates: 30, 40, and 50 SCFH. $O_2$ flow rates: 8. Treatment times: 4 sec, 10 or 30 sec After plasma treatment, the wettability of the shell surface increase as indicated by a decrease of surface tension. This is tested by using Accudyne solutions with different surface tension (35, 40, 45, 50 and 60 dyne). The Accudyne solution would spread on a treated surface with similar or lower surface tension and would bead up on a treated surface of higher surface tension. Significant improvement in wettability is obtained when shells are treated, for example, for about 30 seconds at plasma intensity of 90 and Argon flow rate of 30SCFH. No significant difference is observed between argon plasma vs. argon/$O_2$ plasma.

While the invention has been described with reference to preferred and example embodiments, it will be understood by those skilled in the art that a variety of modifications, additions and deletions are within the scope of the invention, as defined by the following claims.

What is claimed is:

1. A method for producing ready-to-use silicone hydrogel contact lenses each having a durable plasma hydrophilic coating, comprising the steps of:
    (a) generating an atmospheric plasma flow from a working gas by atmospheric pressure discharges at a surrounding atmospheric pressure, wherein the working gas comprises at least one organic compound selected from the group consisting of a $C_1$-$C_{12}$ alkane, an oxaalkane having up to 12 carbon atoms, a $C_2$-$C_{12}$ alkene, an oxaalkene having up to 12 carbon atoms, a $C_2$-$C_{12}$ alkyne, a $C_1$-$C_{12}$ alkanol, a cycloalkanol having up to 12 carbon atoms, an oxaallyne having up to 12 carbon atoms, a mono-clooxaalkane having up to 12 carbon atoms, a bi-clooxaalkane having up to 12 carbon atoms, a tricycloalkane having up to 12 carbon atoms, an aromatic hydrocarbon having up to 12 carbon atoms, and combinations, wherein the at least one organic compound is unsubstituted or substituted by hydroxy, amino, formyl or carboxyl, and has up to 12 carbon atoms;
    (b) controlling the continuity of the atmospheric plasma flow with a power generator;
    (c) introducing the atmospheric plasma flow to a surface of a wet or blot-dried wet silicone hydrogel contact lens to form a plasma coating on the wet or blot-dried wet silicone hydrogel contact lens;
    (d) placing and sealing the silicone hydrogel contact lens with the plasma coating thereon in a lens package containing a buffered saline; and

| Conditions: | Treatment time (sec) | Surface tension of Accudyne solution (dynes) | | | | |
|---|---|---|---|---|---|---|
| | | 35 | 40 | 45 | 50 | 60 |
| Untreated | | beading | beading | Beading | beading | beading |
| Ar flow rate = 30SCFH*, 1.50 current, distance = 3 mm | 3 | beading | NA | Slight beading | NA | beading |
| Ar flow rate = 30SCFH, 1.50 current, distance = 3 mm | 10 | ok | NA | Beading | NA | beading |
| Ar flow rate = 30SCFH, 1.50 current, distance = 1 mm | 10 | slight beading | NA | slight beading | NA | slight beading |
| Ar flow rate = 40 SCFH, 1.50 current, distance = 1 mm | 10 | slight beading | NA | slight beading | NA | slight beading |
| Ar flow rate = 50 SCFH, 2.38 current, plasma intensity = 99, | 10 | OK | OK | OK | OK | OK |
| Ar flow rate = 50 SCFH, 2.38 current, plasma intensity = 99, | 3 | OK | beading | beading | beading | beading |
| Ar flow rate = 30 SCFH, 2.38 current, plasma intensity = 99, | 3 | OK | OK | OK | OK | OK |
| Ar flow rate = 30 SCFH, 1.47 current, plasma intensity = 69, | 10 | OK | OK | Beading | Beading | Beading |
| Ar flow rate = 30 SCFH, 1.47 current, plasma intensity = 69, | 30 | OK | OK | OK | OK | OK |
| Ar flow rate = 50 SCFH, 1.47 current, plasma intensity = 69, | 10 | OK | OK | Slight beading | Slight beading | Slight beading |
| Ar flow rate = 30 SCFH, 2.39 current, plasma intensity = 99, | 5 | OK | Beading | Beading | Beading | Beading |
| Ar flow rate = 30 SCFH, 2.67 current, plasma intensity = 99, | 15 | OK | OK | Beading | Beading | Beading |
| Ar flow rate = 30 SCFH, plasma intensity = 90, | 3 | OK | OK | Beading | Beading | Beading |
| | 4 | OK | OK | Slight Beading | Beading | Beading |
| | 30 | OK | OK | OK | OK | OK |

(e) autoclaving the sealed lens package containing the silicone hydrogel contact lens with the plasma coating thereon so as to obtain the ready-to-use silicone hydrogel contact lens, wherein the plasma coating on the ready-to-use silicone hydrogel contact lens survives autoclaving and imparts to the ready-to-use silicone hydrogel contact lens a hydrophilicity/wettability characterized by having a water-break-up time of at least about 5 seconds and/or no more than about 30% of increase in average water contact angle relative to the same plasma coating before autoclaving.

2. The method of claim 1, wherein the at least one organic compound is selected from the group consisting of an alkane having up to 8 carbon atoms, an alkyne having up to 8 carbon atoms, an alkanol having up to 8 carbon atoms, a cycloalkanol having up to 8 carbon atoms, and combinations thereof.

3. The method of claim 1, wherein the organic compound is acetylene.

4. The method of claim 1, wherein the working gas comprises air, nitrogen, oxygen, or a mixture thereof.

5. The method of claim 1, wherein the working gas comprises at least one vinylic monomer selected from the group consisting of acrylamide, methacrylamide, N,N-dimethylacrylamide, N,N-dimethylmethacrylamide, 2-acrylamidoglycolic acid, 3-acryloylamino-1-propanol, N-hydroxyethyl acrylamide, N-[tris(hydroxymethyl)methyl]acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate, 2-hydroxyethyl acrylate, hydroxypropyl acrylate, hydroxypropyl methacrylate, trimethylammonium 2-hydroxy propylmethacrylate hydrochloride, aminopropyl methacrylate hydrochloride, dimethylaminoethyl methacrylate, glycerol methacrylate, N-vinyl-2-pyrrolidone, allyl alcohol, vinylpyridine, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, N-vinyl caprolactam, and mixtures thereof.

6. The method of claim 1, wherein the working gas comprises N,N-dimethylacrylamide, 2-hydroxyethylmethacrylate, 2-hydroxyethyl acrylate, N-vinyl-2-pyrrolidone, glycerol methacrylate, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, acrylamide, methacrylamide, or a combination thereof.

7. The method of claim 1, wherein the working gas comprises a carrier gas comprising at least one inert gas selected from the group consisting of argon, helium, xenon and combinations thereof.

8. The method of claim 1, wherein the atmospheric plasma flow is introduced onto the surface of the wet or blot-dried wet silicone hydrogel contact lens through a nozzle at atmospheric pressure.

9. The method of claim 1, wherein in the step (c) a uniform plasma cloud completely surrounds or spreads over the boundary layer of a substrate surface.

10. The method of claim 1, wherein the step (c) is performed in a chamber including an entrance valve for introducing the plasma flow into the chamber and an exit valve for releasing the plasma flow from the chamber at a defined rate.

11. The method of claim 1, further comprising controlling the atmospheric plasma flow with a power amplifier, wherein the power amplifier is adapted to effect a flow that is continuous or pulsed.

12. The method of claim 1, wherein the ready-to-use silicone hydrogel contact lens has at least one property selected from the group consisting of: (i) an averaged water contact angle of about 80 degrees or less; (ii) an oxygen permeability of at least about 40 barrers; (iii) an elastic modulus of from about 0.1 MPa to about 2.0 MPa; and (iv) an equilibrium water content of from about 15% to about 55% by weight when fully hydrated; and (vi) combinations thereof.

13. The method of claim 2, wherein the working gas comprises air, nitrogen, oxygen, or a mixture thereof.

14. The method of claim 3, wherein the working gas comprises air, nitrogen, oxygen, or a mixture thereof.

15. The method of claim 2, wherein the working gas comprises N,N-dimethylacrylamide, 2-hydroxyethylmethacrylate, 2-hydroxyethyl acrylate, N-vinyl-2-pyrrolidone, glycerol methacrylate, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, acrylamide, methacrylamide, or a combination thereof.

16. The method of claim 3, wherein the working gas comprises N,N-dimethylacrylamide, 2-hydroxyethylmethacrylate, 2-hydroxyethyl acrylate, N-vinyl-2-pyrrolidone, glycerol methacrylate, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, acrylamide, methacrylamide, or a combination thereof.

17. The method of claim 14, wherein the working gas comprises N,N-dimethylacrylamide, 2-hydroxyethylmethacrylate, 2-hydroxyethyl acrylate, N-vinyl-2-pyrrolidone, glycerol methacrylate, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, acrylamide, methacrylamide, or a combination thereof.

18. The method of claim 15, wherein the working gas comprises N,N-dimethylacrylamide, 2-hydroxyethylmethacrylate, 2-hydroxyethyl acrylate, N-vinyl-2-pyrrolidone, glycerol methacrylate, a $C_1$-$C_4$-alkoxy polyethylene glycol methacrylate having a weight average molecular weight of up to 1500, a $C_1$-$C_4$-alkoxy polyethylene glycol acrylate having a weight average molecular weight of up to 1500, methacrylic acid, N-vinyl formamide, N-vinyl acetamide, N-vinyl isopropylamide, N-vinyl-N-methyl acetamide, acrylamide, methacrylamide, or a combination thereof.

19. The method of claim 17, wherein the working gas comprises a carrier gas comprising at least one inert gas selected from the group consisting of argon, helium, xenon and combinations thereof.

20. The method of claim 18, wherein the working gas comprises a carrier gas comprising at least one inert gas selected from the group consisting of argon, helium, xenon and combinations thereof.

* * * * *